United States Patent
Chayarangkan et al.

(10) Patent No.: US 8,953,271 B1
(45) Date of Patent: Feb. 10, 2015

(54) DISK DRIVE COMPENSATING FOR REPEATABLE RUN OUT SELECTIVELY PER ZONE

(71) Applicant: Western Digital Technologies, Inc., Irvine, CA (US)

(72) Inventors: Tanaat Wut Chayarangkan, Nonthaburi (TH); Julasak Kungsadankosit, Irvine, CA (US); Thitinun Jittramatr, Suphanburi (TH); Siam Samuhatananon, Bangkok (TH); Chin Yang Choong, Kepong (MY); Wei Kiat Chen, Seri Kembangan (MY); Eugene Chun-Tsing Wu, Irvine, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/928,845

(22) Filed: Jun. 27, 2013

Related U.S. Application Data

(60) Provisional application No. 61/822,862, filed on May 13, 2013.

(51) Int. Cl.
G11B 5/596 (2006.01)
(52) U.S. Cl.
CPC .................................. *G11B 5/59627* (2013.01)
USPC .......................................... 360/55; 360/77.04
(58) Field of Classification Search
None
See application file for complete search history.

(56) References Cited

U.S. PATENT DOCUMENTS

| | | |
|---|---|---|
| 6,014,283 A | 1/2000 | Codilian et al. |
| 6,052,076 A | 4/2000 | Patton, III et al. |
| 6,052,250 A | 4/2000 | Golowka et al. |
| 6,067,206 A | 5/2000 | Hull et al. |
| 6,078,453 A | 6/2000 | Dziallo et al. |
| 6,091,564 A | 7/2000 | Codilian et al. |
| 6,094,020 A | 7/2000 | Goretzki et al. |
| 6,101,065 A | 8/2000 | Alfred et al. |
| 6,104,153 A | 8/2000 | Codilian et al. |
| 6,122,133 A | 9/2000 | Nazarian et al. |
| 6,122,135 A | 9/2000 | Stich |
| 6,141,175 A | 10/2000 | Nazarian et al. |
| 6,160,368 A | 12/2000 | Plutowski |
| 6,181,502 B1 | 1/2001 | Hussein et al. |
| 6,195,222 B1 | 2/2001 | Heminger et al. |
| 6,198,584 B1 | 3/2001 | Codilian et al. |
| 6,198,590 B1 | 3/2001 | Codilian et al. |
| 6,204,988 B1 | 3/2001 | Codilian et al. |
| 6,243,223 B1 | 6/2001 | Elliott et al. |
| 6,281,652 B1 | 8/2001 | Ryan et al. |
| 6,285,521 B1 | 9/2001 | Hussein |
| 6,292,320 B1 | 9/2001 | Mason et al. |
| 6,310,742 B1 | 10/2001 | Nazarian et al. |
| 6,320,718 B1 | 11/2001 | Bouwkamp et al. |

(Continued)

*Primary Examiner* — Wayne Young
*Assistant Examiner* — James L Habermehl

(57) ABSTRACT

A disk drive is disclosed comprising a head actuated over a disk comprising a plurality of servo tracks, wherein each servo track comprises a plurality of servo sectors. A plurality of zones are defined, wherein each zone comprises a plurality of the servo tracks. A metric is generated for each zone, and when the metric for a first zone exceeds a first threshold, feedback compensation values for at least two servo tracks are generated, wherein the feedback compensation values compensate for a written-in error of the servo sectors of each servo track. When the metric for a second zone does not exceed the first threshold, generating feedback compensation values for the second zone is skipped.

10 Claims, 8 Drawing Sheets

(56) References Cited

U.S. PATENT DOCUMENTS

| | | |
|---|---|---|
| 6,342,984 B1 | 1/2002 | Hussein et al. |
| 6,347,018 B1 | 2/2002 | Kadlec et al. |
| 6,369,972 B1 | 4/2002 | Codilian et al. |
| 6,369,974 B1 | 4/2002 | Asgari et al. |
| 6,462,896 B1 | 10/2002 | Codilian et al. |
| 6,476,996 B1 | 11/2002 | Ryan |
| 6,484,577 B1 | 11/2002 | Bennett |
| 6,493,169 B1 | 12/2002 | Ferris et al. |
| 6,496,324 B1 | 12/2002 | Golowka et al. |
| 6,498,698 B1 | 12/2002 | Golowka et al. |
| 6,507,450 B1 | 1/2003 | Elliott |
| 6,534,936 B2 | 3/2003 | Messenger et al. |
| 6,538,839 B1 | 3/2003 | Ryan |
| 6,545,835 B1 | 4/2003 | Codilian et al. |
| 6,549,359 B1 | 4/2003 | Bennett et al. |
| 6,549,361 B1 | 4/2003 | Bennett et al. |
| 6,560,056 B1 | 5/2003 | Ryan |
| 6,568,268 B1 | 5/2003 | Bennett |
| 6,574,062 B1 | 6/2003 | Bennett et al. |
| 6,577,465 B1 | 6/2003 | Bennett et al. |
| 6,614,615 B1 | 9/2003 | Ju et al. |
| 6,614,618 B1 | 9/2003 | Sheh et al. |
| 6,636,377 B1 | 10/2003 | Yu et al. |
| 6,690,536 B1 | 2/2004 | Ryan |
| 6,693,764 B1 | 2/2004 | Sheh et al. |
| 6,707,635 B1 | 3/2004 | Codilian et al. |
| 6,710,953 B1 | 3/2004 | Vallis et al. |
| 6,710,966 B1 | 3/2004 | Codilian et al. |
| 6,714,371 B1 | 3/2004 | Codilian |
| 6,714,372 B1 | 3/2004 | Codilian et al. |
| 6,724,564 B1 | 4/2004 | Codilian et al. |
| 6,731,450 B1 | 5/2004 | Codilian et al. |
| 6,735,041 B1 | 5/2004 | Codilian et al. |
| 6,738,220 B1 | 5/2004 | Codilian |
| 6,747,837 B1 | 6/2004 | Bennett |
| 6,760,186 B1 | 7/2004 | Codilian et al. |
| 6,788,483 B1 | 9/2004 | Ferris et al. |
| 6,791,785 B1 | 9/2004 | Messenger et al. |
| 6,795,268 B1 | 9/2004 | Ryan |
| 6,819,518 B1 | 11/2004 | Melkote et al. |
| 6,826,006 B1 | 11/2004 | Melkote et al. |
| 6,826,007 B1 | 11/2004 | Patton, III |
| 6,847,502 B1 | 1/2005 | Codilian |
| 6,850,383 B1 | 2/2005 | Bennett |
| 6,850,384 B1 | 2/2005 | Bennett |
| 6,867,944 B1 | 3/2005 | Ryan |
| 6,876,508 B1 | 4/2005 | Patton, III et al. |
| 6,882,496 B1 | 4/2005 | Codilian et al. |
| 6,885,514 B1 | 4/2005 | Codilian et al. |
| 6,898,047 B2 * | 5/2005 | Shishida et al. ........... 360/77.04 |
| 6,900,958 B1 | 5/2005 | Yi et al. |
| 6,900,959 B1 | 5/2005 | Gardner et al. |
| 6,903,897 B1 | 6/2005 | Wang et al. |
| 6,914,740 B1 | 7/2005 | Tu et al. |
| 6,914,743 B1 | 7/2005 | Narayana et al. |
| 6,920,004 B1 | 7/2005 | Codilian et al. |
| 6,924,959 B1 | 8/2005 | Melkote et al. |
| 6,924,960 B1 | 8/2005 | Melkote et al. |
| 6,924,961 B1 | 8/2005 | Melkote et al. |
| 6,934,114 B1 | 8/2005 | Codilian et al. |
| 6,934,135 B1 | 8/2005 | Ryan |
| 6,937,420 B1 | 8/2005 | McNab et al. |
| 6,937,423 B1 | 8/2005 | Ngo et al. |
| 6,952,322 B1 | 10/2005 | Codilian et al. |
| 6,954,324 B1 | 10/2005 | Tu et al. |
| 6,958,881 B1 | 10/2005 | Codilian et al. |
| 6,963,465 B1 | 11/2005 | Melkote et al. |
| 6,965,488 B1 | 11/2005 | Bennett |
| 6,967,458 B1 | 11/2005 | Bennett et al. |
| 6,967,811 B1 | 11/2005 | Codilian et al. |
| 6,970,319 B1 | 11/2005 | Bennett et al. |
| 6,972,539 B1 | 12/2005 | Codilian et al. |
| 6,972,540 B1 | 12/2005 | Wang et al. |
| 6,972,922 B1 | 12/2005 | Subrahmanyam et al. |
| 6,975,480 B1 | 12/2005 | Codilian et al. |
| 6,977,789 B1 | 12/2005 | Cloke |
| 6,980,389 B1 | 12/2005 | Kupferman |
| 6,987,636 B1 | 1/2006 | Chue et al. |
| 6,987,639 B1 | 1/2006 | Yu |
| 6,989,954 B1 | 1/2006 | Lee et al. |
| 6,992,848 B1 | 1/2006 | Agarwal et al. |
| 6,992,851 B1 | 1/2006 | Cloke |
| 6,992,852 B1 | 1/2006 | Ying et al. |
| 6,995,941 B1 | 2/2006 | Miyamura et al. |
| 6,999,263 B1 | 2/2006 | Melkote et al. |
| 6,999,267 B1 | 2/2006 | Melkote et al. |
| 7,006,320 B1 | 2/2006 | Bennett et al. |
| 7,016,134 B1 | 3/2006 | Agarwal et al. |
| 7,023,637 B1 | 4/2006 | Kupferman |
| 7,023,640 B1 | 4/2006 | Codilian et al. |
| 7,027,256 B1 | 4/2006 | Subrahmanyam et al. |
| 7,027,257 B1 | 4/2006 | Kupferman |
| 7,035,026 B2 | 4/2006 | Codilian et al. |
| 7,046,472 B1 | 5/2006 | Melkote et al. |
| 7,050,249 B1 | 5/2006 | Chue et al. |
| 7,050,254 B1 | 5/2006 | Yu et al. |
| 7,050,258 B1 | 5/2006 | Codilian |
| 7,054,098 B1 | 5/2006 | Yu et al. |
| 7,061,714 B1 | 6/2006 | Yu |
| 7,064,918 B1 | 6/2006 | Codilian et al. |
| 7,068,451 B1 | 6/2006 | Wang et al. |
| 7,068,459 B1 | 6/2006 | Cloke et al. |
| 7,068,461 B1 | 6/2006 | Chue et al. |
| 7,068,463 B1 | 6/2006 | Ji et al. |
| 7,088,547 B1 | 8/2006 | Wang et al. |
| 7,095,579 B1 | 8/2006 | Ryan et al. |
| 7,110,208 B1 | 9/2006 | Miyamura et al. |
| 7,110,214 B1 | 9/2006 | Tu et al. |
| 7,113,362 B1 | 9/2006 | Lee et al. |
| 7,113,365 B1 | 9/2006 | Ryan et al. |
| 7,116,505 B1 | 10/2006 | Kupferman |
| 7,126,781 B1 | 10/2006 | Bennett |
| 7,158,329 B1 | 1/2007 | Ryan |
| 7,180,703 B1 | 2/2007 | Subrahmanyam et al. |
| 7,184,230 B1 | 2/2007 | Chue et al. |
| 7,196,864 B1 | 3/2007 | Yi et al. |
| 7,199,966 B1 | 4/2007 | Tu et al. |
| 7,203,021 B1 | 4/2007 | Ryan et al. |
| 7,209,321 B1 | 4/2007 | Bennett |
| 7,212,364 B1 | 5/2007 | Lee |
| 7,212,374 B1 | 5/2007 | Wang et al |
| 7,215,504 B1 | 5/2007 | Bennett |
| 7,224,546 B1 | 5/2007 | Orakcilar et al. |
| 7,248,426 B1 | 7/2007 | Weerasooriya et al. |
| 7,251,098 B1 | 7/2007 | Wang et al. |
| 7,253,582 B1 | 8/2007 | Ding et al. |
| 7,253,989 B1 | 8/2007 | Lau et al. |
| 7,265,933 B1 | 9/2007 | Phan et al. |
| 7,289,288 B1 | 10/2007 | Tu |
| 7,298,574 B1 | 11/2007 | Melkote et al. |
| 7,301,717 B1 | 11/2007 | Lee et al. |
| 7,304,819 B1 | 12/2007 | Melkote et al. |
| 7,330,019 B1 | 2/2008 | Bennett et al. |
| 7,330,327 B1 | 2/2008 | Chue et al. |
| 7,333,280 B1 | 2/2008 | Lifchits et al. |
| 7,333,290 B1 | 2/2008 | Kupferman |
| 7,339,761 B1 | 3/2008 | Tu et al. |
| 7,365,932 B1 | 4/2008 | Bennett |
| 7,388,728 B1 | 6/2008 | Chen et al. |
| 7,391,583 B1 | 6/2008 | Sheh et al. |
| 7,391,584 B1 | 6/2008 | Sheh et al. |
| 7,433,143 B1 | 10/2008 | Ying et al. |
| 7,440,210 B1 | 10/2008 | Lee |
| 7,440,225 B1 | 10/2008 | Chen et al. |
| 7,450,334 B1 | 11/2008 | Wang et al. |
| 7,450,336 B1 | 11/2008 | Wang et al. |
| 7,453,661 B1 | 11/2008 | Jang et al. |
| 7,457,071 B1 | 11/2008 | Sheh |
| 7,466,509 B1 | 12/2008 | Chen et al. |
| 7,468,855 B1 | 12/2008 | Weerasooriya et al. |
| 7,477,471 B1 | 1/2009 | Nemshick et al. |
| 7,480,116 B1 | 1/2009 | Bennett |
| 7,489,464 B1 | 2/2009 | McNab et al. |
| 7,492,546 B1 | 2/2009 | Miyamura |

(56) References Cited

U.S. PATENT DOCUMENTS

| | | |
|---|---|---|
| 7,495,857 B1 | 2/2009 | Bennett |
| 7,499,236 B1 | 3/2009 | Lee et al. |
| 7,502,192 B1 | 3/2009 | Wang et al. |
| 7,502,195 B1 | 3/2009 | Wu et al. |
| 7,502,197 B1 | 3/2009 | Chue |
| 7,505,223 B1 | 3/2009 | McCornack |
| 7,542,225 B1 | 6/2009 | Ding et al. |
| 7,548,392 B1 | 6/2009 | Desai et al. |
| 7,551,390 B1 | 6/2009 | Wang et al. |
| 7,558,016 B1 | 7/2009 | Le et al. |
| 7,573,670 B1 | 8/2009 | Ryan et al. |
| 7,576,941 B1 | 8/2009 | Chen et al. |
| 7,580,212 B1 | 8/2009 | Li et al. |
| 7,583,470 B1 | 9/2009 | Chen et al. |
| 7,589,930 B2 * | 9/2009 | Hanson et al. ............. 360/77.04 |
| 7,595,954 B1 | 9/2009 | Chen et al. |
| 7,602,575 B1 | 10/2009 | Lifchits et al. |
| 7,616,399 B1 | 11/2009 | Chen et al. |
| 7,619,844 B1 | 11/2009 | Bennett |
| 7,626,782 B1 | 12/2009 | Yu et al. |
| 7,630,162 B2 | 12/2009 | Zhao et al. |
| 7,639,447 B1 | 12/2009 | Yu et al. |
| 7,656,604 B1 | 2/2010 | Liang et al. |
| 7,656,607 B1 | 2/2010 | Bennett |
| 7,660,067 B1 | 2/2010 | Ji et al. |
| 7,663,835 B1 | 2/2010 | Yu et al. |
| 7,675,700 B2 * | 3/2010 | Takeda et al. ............. 360/77.04 |
| 7,675,707 B1 | 3/2010 | Liu et al. |
| 7,679,854 B1 | 3/2010 | Narayana et al. |
| 7,688,534 B1 | 3/2010 | McCornack |
| 7,688,538 B1 | 3/2010 | Chen et al. |
| 7,688,539 B1 | 3/2010 | Bryant et al. |
| 7,697,233 B1 | 4/2010 | Bennett et al. |
| 7,701,661 B1 | 4/2010 | Bennett |
| 7,710,676 B1 | 5/2010 | Chue |
| 7,715,138 B1 | 5/2010 | Kupferman |
| 7,729,079 B1 | 6/2010 | Huber |
| 7,733,189 B1 | 6/2010 | Bennett |
| 7,746,592 B1 | 6/2010 | Liang et al. |
| 7,746,594 B1 | 6/2010 | Guo et al. |
| 7,746,595 B1 | 6/2010 | Guo et al. |
| 7,760,461 B1 | 7/2010 | Bennett |
| 7,764,459 B2 | 7/2010 | Cho |
| 7,787,210 B1 * | 8/2010 | Drouin et al. ............. 360/77.04 |
| 7,800,853 B1 | 9/2010 | Guo et al. |
| 7,800,856 B1 | 9/2010 | Bennett et al. |
| 7,800,857 B1 | 9/2010 | Calaway et al. |
| 7,839,591 B1 | 11/2010 | Weerasooriya et al. |
| 7,839,595 B1 | 11/2010 | Chue et al. |
| 7,839,600 B1 | 11/2010 | Babinski et al. |
| 7,843,662 B1 | 11/2010 | Weerasooriya et al. |
| 7,852,588 B1 | 12/2010 | Ferris et al. |
| 7,852,592 B1 | 12/2010 | Liang et al. |
| 7,864,481 B1 | 1/2011 | Kon et al. |
| 7,864,482 B1 | 1/2011 | Babinski et al. |
| 7,869,155 B1 | 1/2011 | Wong |
| 7,869,156 B2 * | 1/2011 | Takaishi ............. 360/77.04 |
| 7,876,522 B1 | 1/2011 | Calaway et al. |
| 7,876,523 B1 | 1/2011 | Panyavoravaj et al. |
| 7,916,415 B1 | 3/2011 | Chue |
| 7,916,416 B1 | 3/2011 | Guo et al. |
| 7,916,420 B1 | 3/2011 | McFadyen et al. |
| 7,916,422 B1 | 3/2011 | Guo et al. |
| 7,929,238 B1 | 4/2011 | Vasquez |
| 7,961,422 B1 | 6/2011 | Chen et al. |
| 8,000,053 B1 | 8/2011 | Anderson |
| 8,031,423 B1 | 10/2011 | Tsai et al. |
| 8,054,022 B1 | 11/2011 | Ryan et al. |
| 8,059,357 B1 | 11/2011 | Knigge et al. |
| 8,059,360 B1 | 11/2011 | Melkote et al. |
| 8,072,703 B1 | 12/2011 | Calaway et al. |
| 8,077,428 B1 | 12/2011 | Chen et al. |
| 8,078,901 B1 | 12/2011 | Meyer et al. |
| 8,081,395 B1 | 12/2011 | Ferris |
| 8,085,020 B1 | 12/2011 | Bennett |
| 8,116,023 B1 | 2/2012 | Kupferman |
| 8,145,934 B1 | 3/2012 | Ferris et al. |
| 8,179,626 B1 | 5/2012 | Ryan et al. |
| 8,189,286 B1 | 5/2012 | Chen et al. |
| 8,213,106 B1 | 7/2012 | Guo et al. |
| 8,254,222 B1 | 8/2012 | Tang |
| 8,300,348 B1 | 10/2012 | Liu et al. |
| 8,315,005 B1 | 11/2012 | Zou et al. |
| 8,320,069 B1 | 11/2012 | Knigge et al. |
| 8,351,174 B1 | 1/2013 | Gardner et al. |
| 8,358,114 B1 | 1/2013 | Ferris et al. |
| 8,358,145 B1 | 1/2013 | Ferris et al. |
| 8,390,367 B1 | 3/2013 | Bennett |
| 8,432,031 B1 | 4/2013 | Agness et al. |
| 8,432,629 B1 | 4/2013 | Rigney et al. |
| 8,451,697 B1 | 5/2013 | Rigney et al. |
| 8,482,873 B1 | 7/2013 | Chue et al. |
| 8,498,076 B1 | 7/2013 | Sheh et al. |
| 8,498,172 B1 | 7/2013 | Patton, III et al. |
| 8,508,881 B1 | 8/2013 | Babinski et al. |
| 8,531,798 B1 | 9/2013 | Xi et al. |
| 8,537,486 B2 | 9/2013 | Liang et al. |
| 8,542,455 B2 | 9/2013 | Huang et al. |
| 8,553,351 B1 | 10/2013 | Narayana et al. |
| 8,564,899 B2 | 10/2013 | Lou et al. |
| 8,576,506 B1 | 11/2013 | Wang et al. |
| 8,605,382 B1 | 12/2013 | Mallary et al. |
| 8,605,384 B1 | 12/2013 | Liu et al. |
| 8,610,391 B1 | 12/2013 | Yang et al. |
| 8,611,040 B1 | 12/2013 | Xi et al. |
| 8,619,385 B1 | 12/2013 | Guo et al. |
| 8,630,054 B2 | 1/2014 | Bennett et al. |
| 8,630,059 B1 | 1/2014 | Chen et al. |
| 8,634,154 B1 | 1/2014 | Rigney et al. |
| 8,634,283 B1 | 1/2014 | Rigney et al. |
| 8,643,976 B1 | 2/2014 | Wang et al. |
| 8,649,121 B1 | 2/2014 | Smith et al. |
| 8,654,466 B1 | 2/2014 | McFadyen |
| 8,654,467 B1 | 2/2014 | Wong et al. |
| 8,665,546 B1 | 3/2014 | Zhao et al. |
| 8,665,551 B1 | 3/2014 | Rigney et al. |
| 8,670,206 B1 | 3/2014 | Liang et al. |
| 8,687,312 B1 | 4/2014 | Liang |
| 8,693,123 B1 | 4/2014 | Guo et al. |
| 8,693,134 B1 | 4/2014 | Xi et al. |
| 2004/0021977 A1 | 2/2004 | Lim et al. |
| 2005/0201003 A1 * | 9/2005 | Shishida et al. ............. 360/77.04 |
| 2009/0284859 A1 * | 11/2009 | Chung et al. ............. 360/39 |
| 2010/0035085 A1 | 2/2010 | Jung et al. |
| 2012/0284493 A1 | 11/2012 | Lou et al. |
| 2013/0120870 A1 | 5/2013 | Zhou et al. |
| 2013/0148240 A1 | 6/2013 | Ferris et al. |

* cited by examiner

DISK DRIVE COMPENSATING FOR REPEATABLE RUN OUT SELECTIVELY PER ZONE

CROSS-REFERENCE TO RELATED APPLICATIONS

This application claims priority to provisional U.S. Patent Application Ser. No. 61/822,862, filed on May 13, 2013, which is hereby incorporated by reference in its entirety.

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations.

While the disk drive is centerline tracking a data track during write/read operations, there may be repeatable disturbances induced in the servo control system, such as a repeatable runout (RRO) due to an eccentricity of the servo tracks. There may also be a repeatable disturbance due to a "written-in error" of the servo sectors. The RRO and "written-in error" may be considered fixed disturbances that remain substantially constant over the life of the disk drive. Prior art disk drives have typically learned the RRO to generate feed-forward compensation values that force the head to follow the eccentric servo tracks, as well as feedback compensation values that force the head to ignore the repeatable disturbance due to the written-in error. The feed-forward compensation values are typically learned for each zone of each disk surface, wherein each zone represents a band of servo tracks. The written-in error is typically learned for each servo track, and corresponding compensation values recorded in each servo sector of each servo track.

DETAILED DESCRIPTION

Figure 1:
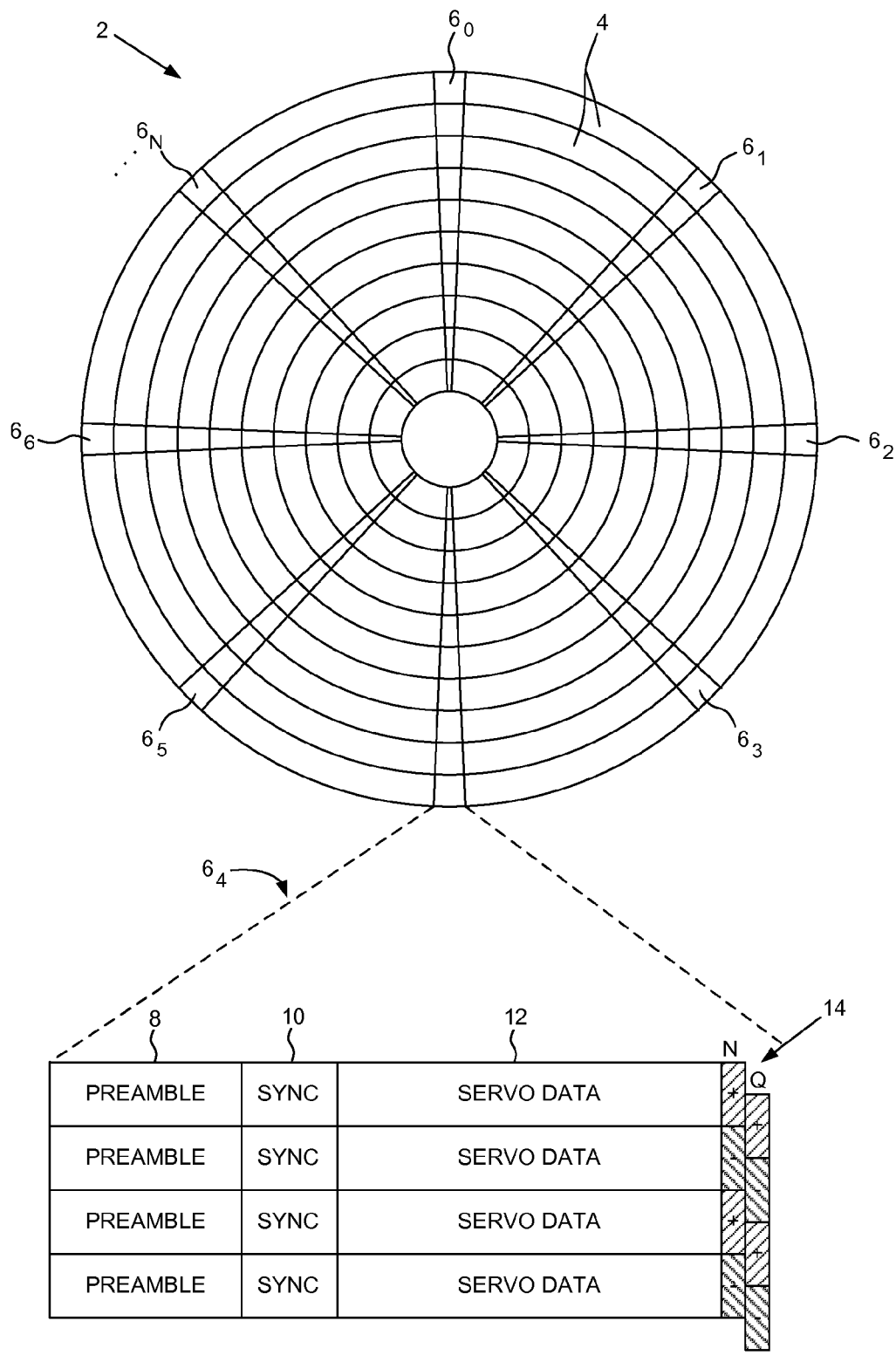
FIG. 1 shows a prior art disk format comprising a plurality of servo tracks defined by servo sectors.
Figure 2:
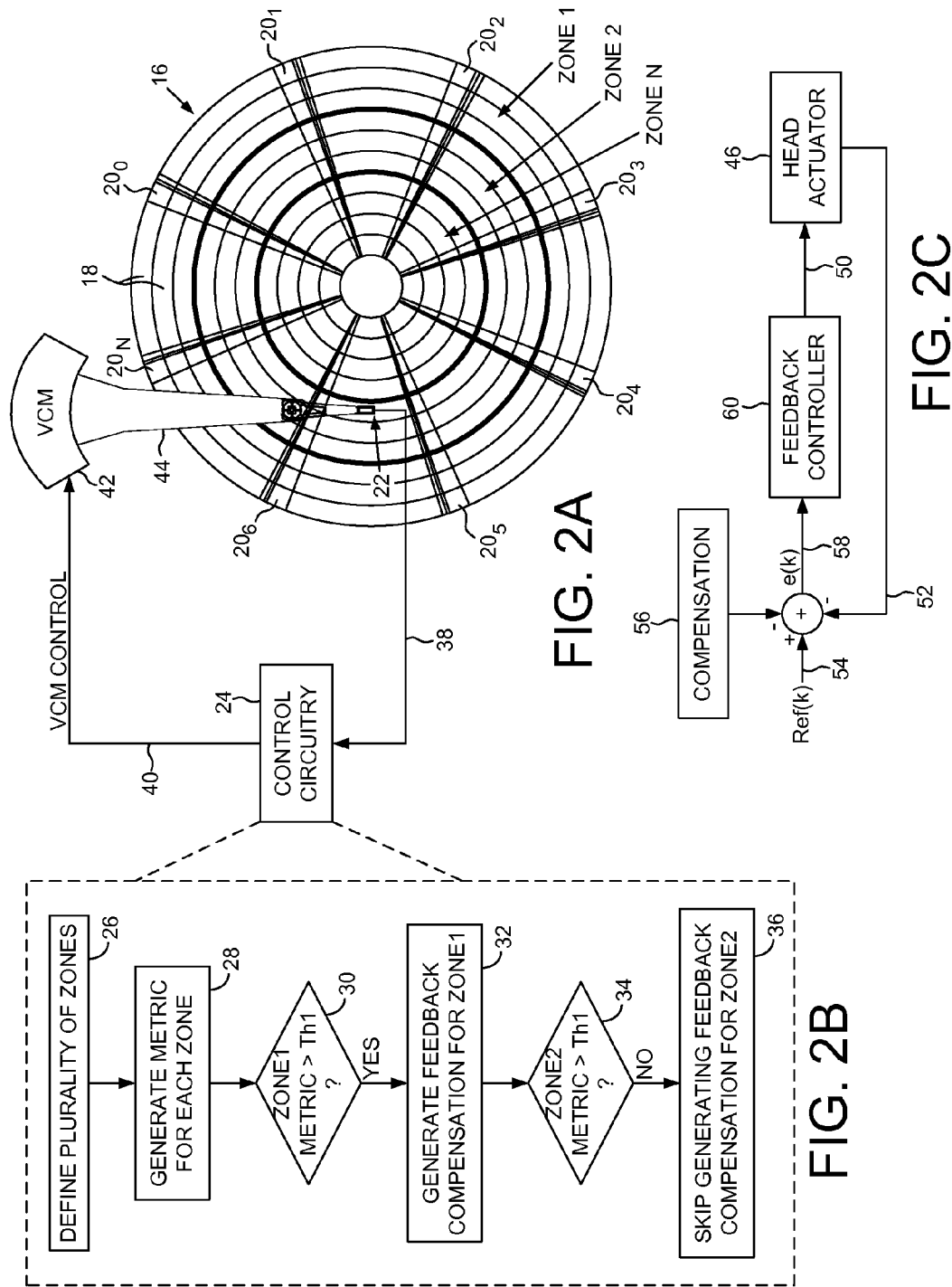
FIG. 2A shows a disk drive according to an embodiment comprising a head actuated over a disk comprising a plurality of servo tracks, wherein each servo track comprises a plurality of servo sectors.
FIG. 2B is a flow diagram according to an embodiment where when a metric for a first zone exceeds a first threshold, feedback compensation values are generated for at least two servo tracks.
FIG. 2C shows an example servo system comprising a head actuator for actuating the head over the disk in response to a control signal generated based on the feedback compensation values.

FIG. 2A shows a disk drive according to an embodiment comprising a disk 16 comprising a plurality of servo tracks 18, wherein each servo track comprises a plurality of servo sectors $20_0$-$20_N$. The disk drive further comprises a head 22 actuated over the disk 16, and control circuitry 24 operable to execute the flow diagram of FIG. 2B. A plurality of zones are defined (ZONE_1 to ZONE_N), wherein each zone comprises a plurality of the servo tracks (block 26). A metric is generated for each zone (block 28), and when the metric for a first zone exceeds a first threshold (block 30), feedback compensation values for at least two servo tracks are generated (block 32), wherein the feedback compensation values compensate for a written-in error of the servo sectors of each servo track. When the metric for a second zone does not exceed the first threshold (block 34), generating feedback compensation values for the second zone is skipped (block 36).

In on embodiment, the control circuitry 24 processes a read signal 38 emanating from the head 22 to demodulate the servo sectors $20_0$-$20_N$ and generate a position error signal (PES) representing an error between the actual position of the head and a target position relative to a target track. The control circuitry 24 filters the PES using a suitable compensation filter to generate a control signal 40 applied to a voice coil motor (VCM) 42 which rotates an actuator arm 44 about a pivot in order to actuate the head 22 radially over the disk 16 in a direction that reduces the PES. The servo sectors $20_0$-$20_N$ may comprise any suitable head position information, such as a track address for coarse positioning and servo bursts for fine positioning. The servo bursts may comprise any suitable pattern, such as an amplitude based servo pattern or a phase based servo pattern.

In one embodiment, the servo sectors $20_0$-$20_N$ comprise a written-in error which causes a repeatable error in the PES when servoing on each servo track. If this repeatable error is significant, the servo system may be unable to track the centerline of a target data track during write/read operations and/or may cause data of adjacent data tracks to be corrupted due to intertrack interference during write operations. Accordingly, in one embodiment the servo system learns the repeatable disturbance due to the written-in error in order to generate feedback compensation values that compensate for the repeatable disturbance. FIG. 2C shows an example servo system comprising a head actuator 46 (e.g., the VCM 42) for actuating the head 22 over the disk 16 in response to a control signal 50. At each servo sector, a measured position 52 of the head 22 is subtracted from a reference position 54 and the result is adjusted by a feedback compensation value 56 to generate the PES 58 processed by a feedback controller 60 which generates the control signal 50. In one embodiment the feedback compensation value 56 is subtracted from the measured position 52 so as to cancel the repeatable disturbance from the PES 58, thereby forcing the head 22 to ignore the repeatable disturbance.

In one embodiment, the feedback compensation values 56 are learned during a calibration procedure that evaluates the PES 58 generated at each servo sector of a servo track. For example, the PES 58 generated at each servo sector may be averaged over multiple disk revolutions to generate an average PES 58 representing the repeatable disturbance. The feedback compensation values for each servo sector may then be generated by computing a circular convolution of the average PES values with the inverse of the servo system's error rejection curve. In another embodiment, the compensation values 56 may be learned on-the-fly by computing a distributed correlation of the convolution as the PES is generated for each servo sector of the servo track. In one embodiment, the feedback compensation value 56 generated for a servo sector of a servo track may be written to the disk 16, for example, just after the servo sector as shown in FIG. 2A. During normal write/read operations, when a servo sector is read the corresponding feedback compensation value is also read and used to generate the PES 58.

In one embodiment, the calibration procedure for learning the feedback compensation values that compensate for the written-in errors of the servo sectors is fairly time consuming. It typically takes two or more disk revolutions for the feedback compensation values to be generated reliably, and then another disk revolution to write the feedback compensation values to the disk. Accordingly, in one embodiment in order to reduce the calibration time, the feedback compensation values are not generated for every servo track. In one embodiment, it is assumed the magnitude of the repeatable disturbance will remain fairly constant over a predetermined radial segment of the disk surface. Accordingly, in one embodiment the disk 16 is divided into a number of zones (ZONE 1, ZONE 2, ... ZONE_N), where each zone comprises a plurality of the servo tracks 18 as shown in FIG. 2A. A metric is then generated for each zone to determine whether the feedback compensation values should be generated for the zone, or whether the zone should be skipped.

Figure 3:
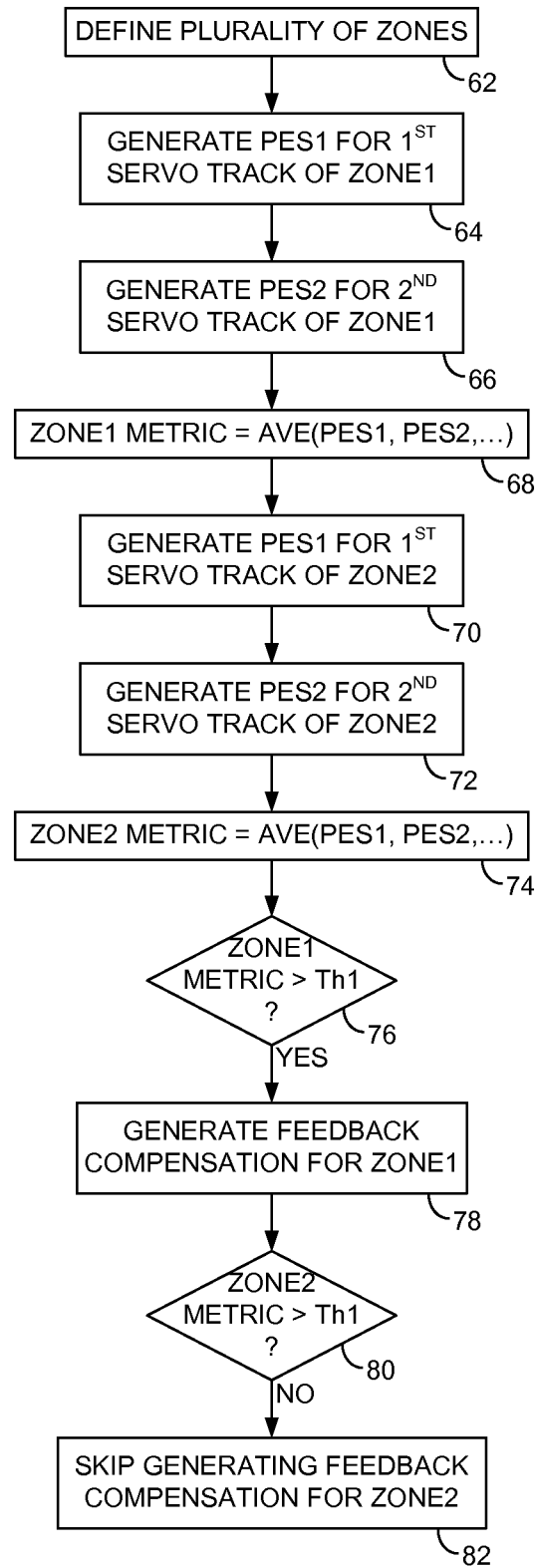
FIG. 3 is a flow diagram according to an embodiment wherein a PES is generated for a number of radially dispersed servo tracks within a zone, and the resulting PES averaged to generate the metric.

Any suitable metric may be generated and used to determine whether the feedback compensation values should be generated for a zone. In one embodiment, the metric may be based on a PES generated for at least one servo track of each zone, and in one embodiment a PES is generated for a number of radially dispersed servo tracks within a zone, and the resulting PES averaged to generate the metric. This embodiment is understood with reference to the flow diagram of FIG. 3 wherein after defining a plurality of zones on the disk (block 62), a PES1 is generated for a first servo track of a first zone (block 64). The PES1 may be generated in any suitable manner, such as by averaging the PES generated for each servo sector within the servo track over multiple disk revolutions, and then averaging the PES generated for all of the servo sectors to generate an aggregate average PES. A PES2 is generated for a second servo track within the first zone (block 66), wherein in one embodiment the second servo track is separated radially from the first servo track. This process may be repeated for any suitable number of servo tracks within the first zone, and then a metric is generated for the first zone as the average of the PES generated for the servo tracks of the first zone (block 68). This process is then repeated for a second zone wherein a PES1 is generated for a first servo track of the second zone (block 70), a PES2 is generated for a second servo track of the second zone (block 72), and so on. A metric is then generated for the second zone as the average of the PES generated for the servo tracks of the second zone (block 74).

The metric generated for the first zone is evaluated at block 76, and if the metric exceeds a first threshold Th1, then the feedback compensation values are generated for the first zone (block 78). The metric generated for the second zone is evaluated at block 80, and if the metric does not exceeds the first threshold Th1, then the second zone is skipped at block 82 (the feedback compensation values are not generated). Accordingly, in this embodiment a certain percentage of the zones will be skipped which decrease the overall calibration time for generating the feedback compensation values for an entire disk surface. In one embodiment, the control circuitry 24 stores a map that indicates which zones have been skipped so that during normal operation the feedback compensation values 56 for a skipped zone are set to zero and not read form the disk.

Figure 4:
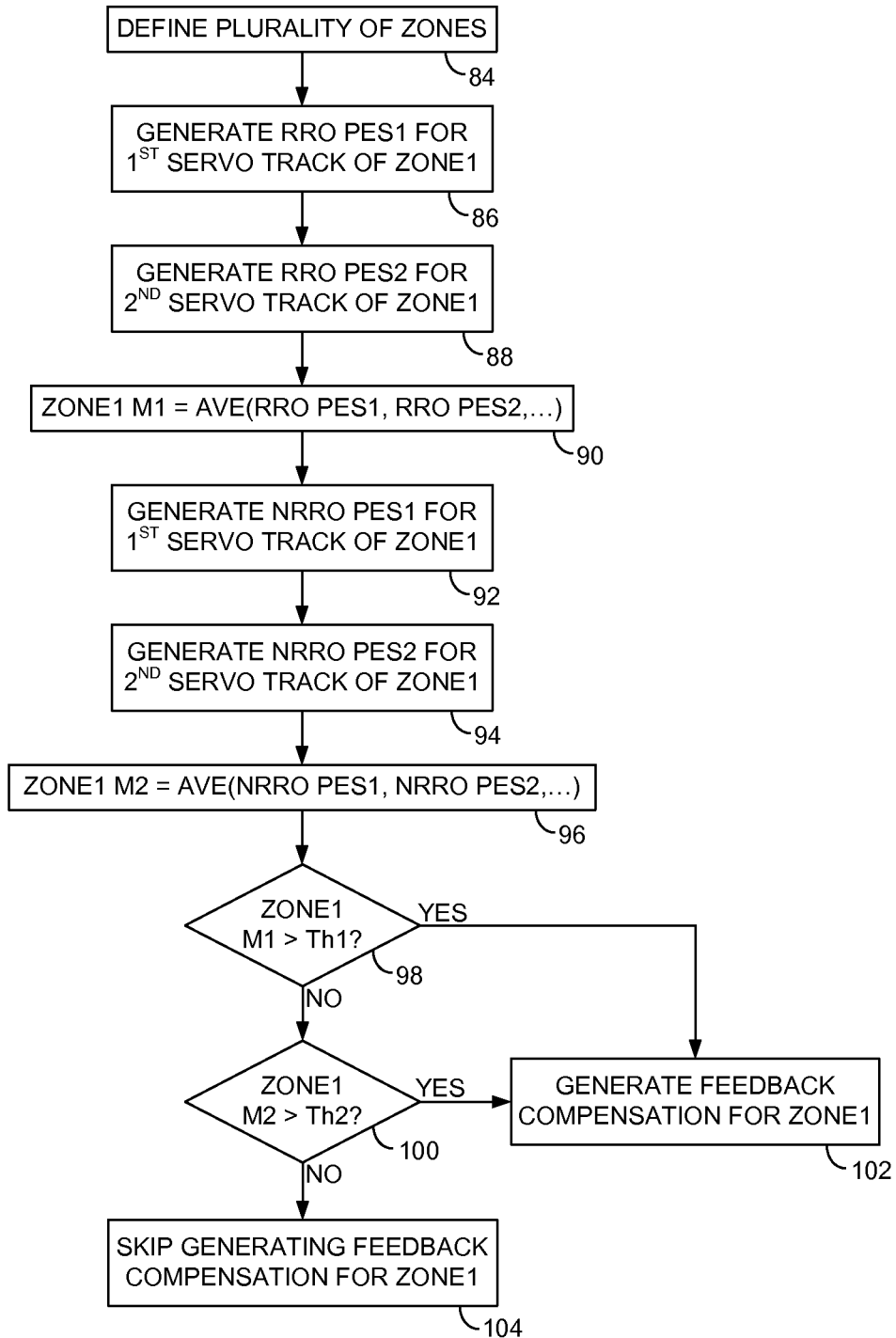
FIG. 4 is a flow diagram according to an embodiment wherein first and second metrics are generated for a zone, and if the first metric exceeds a threshold or the second metric exceeds a threshold, then the feedback compensation values are generated for the corresponding zone.

Averaging the PES generated for each servo sector will generate a metric that represents a repeatable disturbance in the PES, such as the repeatable disturbance caused by the written-in error of the servo sectors. In one embodiment, a first metric is generated based on the repeatable disturbance in the PES, and a second metric is generated based on the non-repeatable disturbance in the PES (which may be generated by subtracting the average PES from each instance of PES). In one embodiment, if the first metric exceeds a threshold or the second metric exceeds a threshold, then the feedback compensation values are generated for the corresponding zone. This embodiment is understood with reference to the flow diagram of FIG. 4, wherein after defining a plurality of zones on the disk (block 84), a repeatable disturbance (RRO PES1) is generated for a first servo track of a first servo zone (block 86), and a repeatable disturbance (RRO PES2) is generated for a second servo track of the first servo zone (block 88), and so on for any suitable number of servo tracks. A first metric is then generated by averaging the repeatable disturbances measured for the servo tracks (block 90). A non-repeatable disturbance (NRRO PES1) is generated for the first servo track of the first servo zone (block 92), and a non-repeatable disturbance (NRRO PES2) is generated for the second servo track of the first servo zone (block 94), and so on for any suitable number of servo tracks. A second metric is then generated by averaging the non-repeatable disturbances measured for the servo tracks (block 96). If the first metric exceeds a threshold Th1 (block 98), or the second metric exceeds a threshold Th2 (block 100), then the feedback compensation values are generated for the first zone (block 102), otherwise the first zone is skipped (block 104). The flow diagram of FIG. 4 is repeated for all of the zones, where some of the zones may be skipped which reduces the calibration time needed to generate the feedback compensation values for the entire disk surface.

Figure 5:
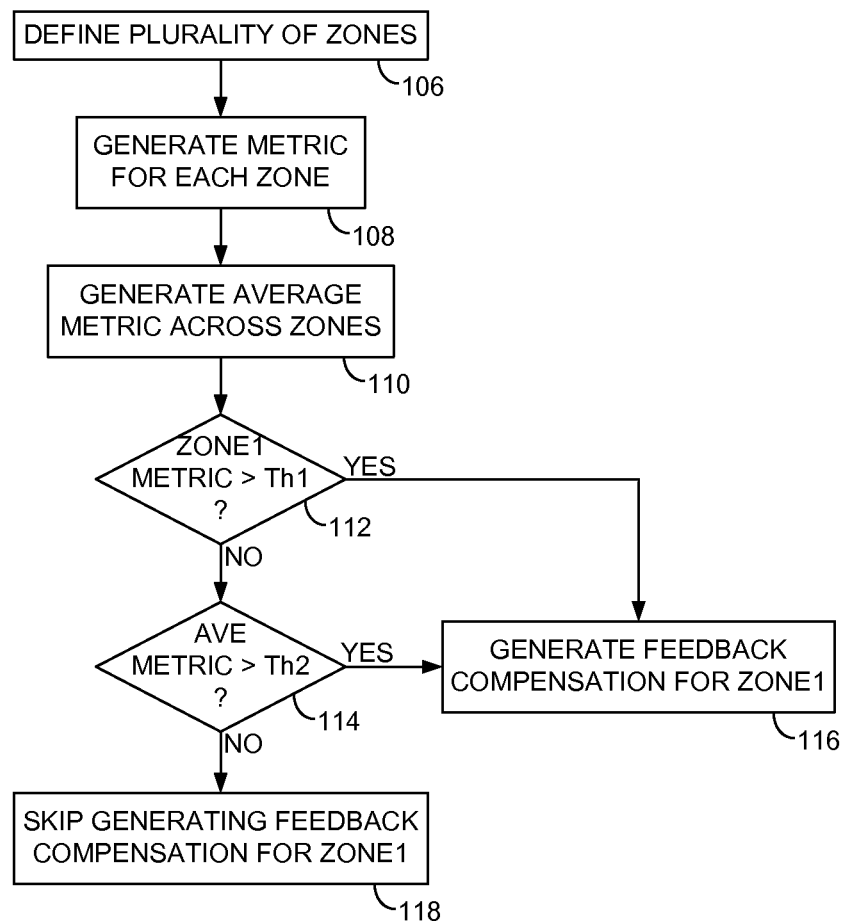
FIG. 5 is a flow diagram according to an embodiment wherein an average metric is generated by averaging the metrics across all the zones of a disk surface, and if the average metric for a disk surface exceeds a threshold, then the feedback compensation values are generated for every zone of the disk surface.

In one embodiment, an average metric is generated by averaging the metrics across all the zones of a disk surface, and if the average metric for a disk surface exceeds a threshold, then the feedback compensation values are generated for every zone of the disk surface. This embodiment is understood with reference to the flow diagram of FIG. 5 wherein after defining a plurality of zones on the disk (block 106), a metric is generated for each zone (block 108), and an average metric is generated by averaging the metrics generated for the zones (block 110). If the metric generated for a first zone does not exceed a first threshold (block 112), but the average metric exceeds a second threshold (block 114), the feedback compensation values are generated for the first zone (block 116), otherwise the first zone is skipped (block 118).

Figures 6, 7:
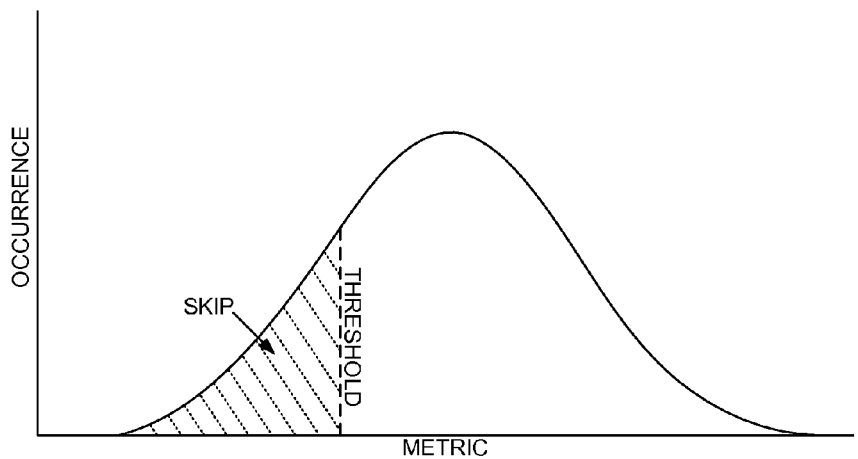
FIG. 6 shows a table that illustrates an example where the shaded numbers represent the zones that are skipped since both the zone metric is less than the first threshold and the average metric is less than the second threshold.
FIG. 7 shows an embodiment wherein the first and second threshold may be selected based on a histogram, for example, by selecting a threshold that results in a desired percentage of zones that will be skipped for each production disk drive.

FIG. 6 shows an example embodiment wherein the disk drive comprises three disks and six disk surfaces (six heads). The control circuitry defines 32 zones on each disk surface and a metric is generated for each zone as shown in the table. In this example, the first threshold for evaluating the zone metric is configured to 320, and the second threshold for evaluating each disk surface (each head) is configured to 400. The shaded numbers in the table of FIG. 6 represent the zones that are skipped since both the zone metric is less than the first threshold and the average metric is less than the second threshold. The fifth disk surface has an average metric of 436 which exceeds the second threshold of 400, and therefore none of the zones of the fifth disk surface are skipped as shown in FIG. 6.

The first and second thresholds for skipping zones may be configured based on any suitable criterion. In one embodiment illustrated in FIG. 7, a representative subset of disk drives may be evaluated in order to generate a histogram of metrics. The first and second threshold may then be selected based on the histogram, for example, by selecting a threshold that results in a desired percentage of zones that will be skipped for each production disk drive. For example, if twenty percent of the zones of a disk surface are skipped, the calibration time to generate the feedback compensation values will be reduced by twenty percent. In one embodiment, a number of production disk drives may be evaluated after the calibration procedure to verify whether they satisfy certain performance criteria. The first and second thresholds for skipping zones may then be adjusted based on the percentage of production disk drives that fail the verification procedure. For example, if too many production disk drives fail the verification procedure, the first and/or second threshold may be decreased, and if too few production disk drives fail the verification procedure, the first and/or second threshold may be increased.

Any suitable metric may be evaluated to determine whether to skip a zone when calibrating the feedback compensation values. In one embodiment, the feedback compensation values may be generated for the subset of servo tracks evaluated for each zone, and the metric generated based on the feedback compensation values (e.g., the average amplitude of the feedback compensation values). In another embodiment, the metric for skipping zones may comprise a track squeeze metric representing a spacing between adjacent servo tracks. The track squeeze metric may be generated as a function of the measured servo bursts in a servo sector that differs from the function used to generate the PES. In other embodiments, the metric for skipping zones may comprise multiple metrics, such as a first metric based on the PES, and a second metric based on a different function of the servo bursts.

Figure 8A:
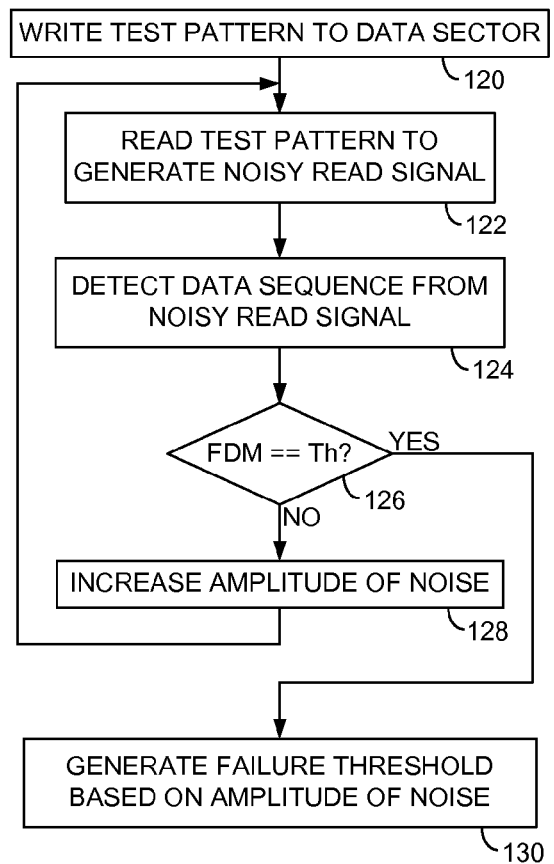
FIGS. 8A and 8B illustrate an embodiment wherein the metric evaluated to determine whether to skip a zone may comprise a failure threshold determined from an amount of noise added to a read signal before a failure detection metric reaches a metric threshold.

FIG. 8A shows a flow diagram according to another embodiment wherein the metric evaluated to determine whether to skip a zone may comprise a failure threshold determined from an amount of noise added to a read signal before a failure detection metric reaches a metric threshold. A test pattern is written to at least one data sector in at least one track (block 120). The test pattern is read from the disk to generate a noisy read signal comprising added noise (block 122), and an estimated data sequence is detected from the noisy read signal (block 124). An amplitude of the added noise is increased (block 126) until a failure detection metric (FDM) reaches a metric threshold (block 128). A failure threshold is generated based on the amplitude of the added noise when the failure detection metric reaches the metric threshold (block 130).

Figure 8B:
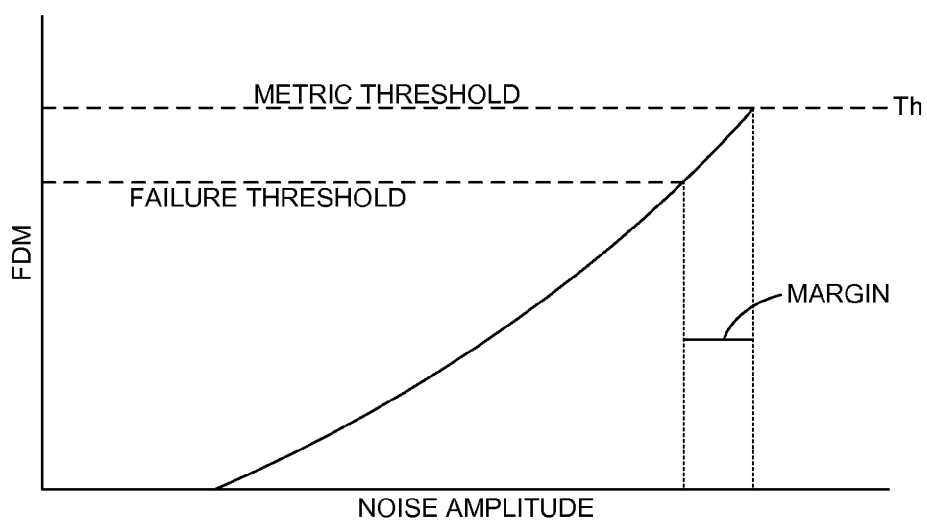

FIG. 8B illustrates an embodiment where a FDM is plotted relative to the amplitude of the noise added to the read signal. In this embodiment, adding noise to the read signal causes the FDM to increase toward a metric threshold. For example, in one embodiment the FDM comprises a number of bits corrected in a data sector when reading the test pattern, wherein the number of bits corrected increases as the noise amplitude increases. When the FDM reaches the metric threshold (e.g., a threshold number of bits corrected), the failure threshold is generated by subtracting a margin from the noise amplitude and setting the failure threshold to the FDM that corresponds to the margin offset as illustrated in FIG. 8B.

In one embodiment, the metric threshold in FIG. 8B corresponds to an inability to accurately detect the test pattern from the noisy read signal. For example, in one embodiment the metric threshold corresponds to the maximum number of bit errors in a data sector that can be corrected by the read channel. Accordingly in this embodiment the metric threshold corresponds to a catastrophic failure of the disk drive, and therefore the failure threshold for predicting failure of the disk drive while in the field is set lower than the metric threshold by a predetermined margin so that a failure is predicted prior to experiencing the catastrophic failure. The failure threshold is set lower by selecting the FDM that corresponds to the noise amplitude offset by a margin from the noise amplitude that caused the FDM to reach the metric threshold.

Any suitable FDM may be measured in the embodiments of the present invention, including any suitable parameter of the read signal (e.g., amplitude of the read signal), any suitable parameter of a read channel for processing the read signal (e.g., variable gain amplifier, timing recovery, equalizer, noise filter, etc.), or any suitable parameter of a sequence detector operable to detect the estimated data sequence from the noisy read signal. In one embodiment, the sequence detector comprises an iterative sequence detector (e.g., a Turbo Code detector, or Low Density Parity Check Code detector), and the FDM and the metric threshold comprise a number of iterations needed to accurately recover the test pattern. For example, the metric threshold may correspond to a maximum number of iterations needed to accurately recover the test pattern before an unrecoverable error is declared.

Figure 8C:
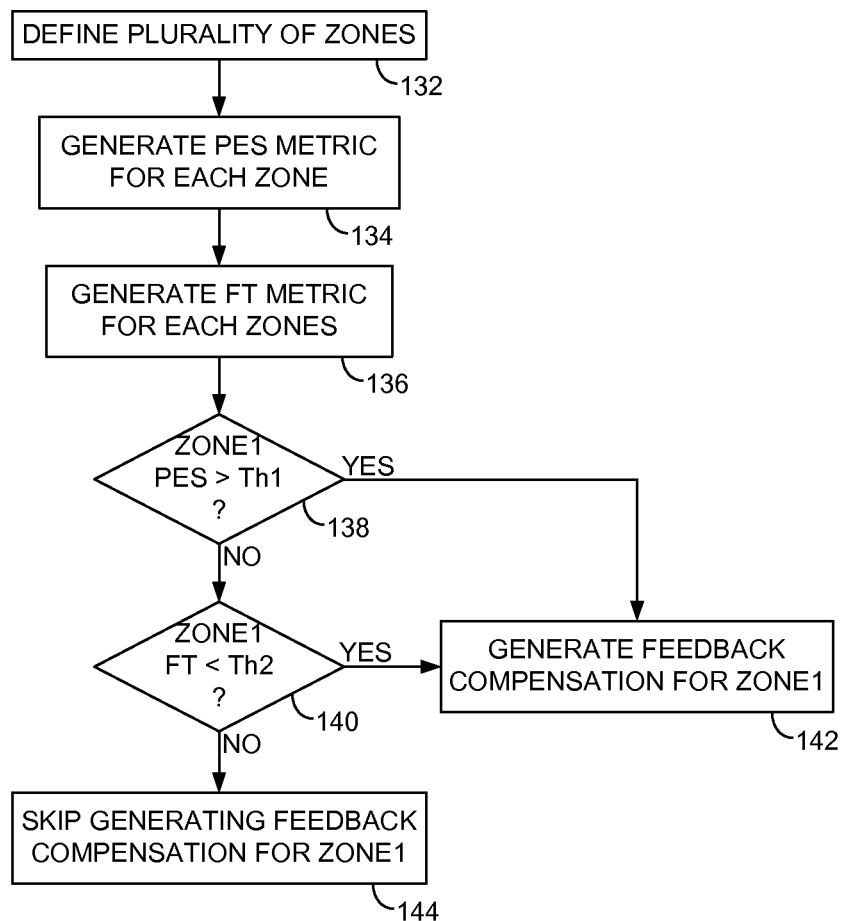
FIG. 8C is a flow diagram according to an embodiment wherein when determining whether to skip a zone when calibrating the feedback compensation values, the control circuitry may evaluate a first metric based on the PES (e.g., RRO) and a second metric based on the calibrated failure threshold.

In embodiment when determining whether to skip a zone when calibrating the feedback compensation values, the control circuitry may evaluate a first metric based on the PES (e.g., RRO) and a second metric based on the failure threshold calibrated as shown in FIG. 8B. This embodiment is understood with reference to the flow diagram of FIG. 8C wherein after defining a plurality of zones (block 132), a PES metric is generated for each zone (block 134) and a failure threshold (FT) metric is generated for each zone (block 136). If the PES metric exceeds a first threshold (block 138), the feedback compensation values are generated for the first zone (block 140). If the PES metric does not exceed the first threshold, but the FT metric exceeds a second threshold (block140), the feedback compensation values are generated for the first zone (block 140), otherwise the first zone is skipped (block 144). In the embodiment of FIG. 8C, the FT exceeds the second threshold at block 140 when the FT is less than the second threshold indicating that a failure is more likely to occur when accessing the first zone. Accordingly, in this embodiment if the PES metric indicates relatively good tracking quality within a zone, but the FT metric indicates a relatively high likelihood of failure (e.g., due to a marginal head), the feedback compensation values may still be generated for the zone in order to decrease the probability of a failure when accessing the zone.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein.

What is claimed is:

1. A disk drive comprising:
    a disk comprising a plurality of servo tracks, wherein each servo track comprises a plurality of servo sectors;
    a head actuated over the disk; and
    control circuitry operable to:
        define a plurality of zones, wherein each zone comprises a plurality of the servo tracks;
        generate a metric for each zone;
        when the metric for a first zone exceeds a first threshold, generate feedback compensation values for at least two servo tracks, wherein the feedback compensation values compensate for a written-in error of the servo sectors of each servo track;
        when the metric for a second zone does not exceed the first threshold, skip generating feedback compensation values for the second zone;
        generate a position error signal (PES) representing a difference between a measured position of the head and a target position;
        generate a repeatable disturbance for each of a plurality of tracks in each zone based on the PES; and
        generate the metric for each zone as an average magnitude of the repeatable disturbance generated for the plurality of tracks.

2. The disk drive as recited in claim 1, wherein the control circuitry is further operable to write the feedback compensation values generated for each servo track to each servo track.

3. The disk drive as recited in claim 1, wherein the control circuitry is further operable to:
    average the metrics generated for the zones to generate an average metric; and
    when the metric for the second zone does not exceed the first threshold and the average metric exceeds a second threshold, generate feedback compensation values for the second zone.

4. A method of operating a disk drive comprising a head actuated over a disk comprising a plurality of servo tracks, wherein each servo track comprises a plurality of servo sectors, the method comprising:
    defining a plurality of zones, wherein each zone comprises a plurality of the servo tracks;
    generating a metric for each zone;
    when the metric for a first zone exceeds a first threshold, generating feedback compensation values for at least two servo tracks, wherein the feedback compensation values compensate for a written-in error of the servo sectors of each servo track;

when the metric for a second zone does not exceed the first threshold, skipping generating feedback compensation values for the second zone;
generating a position error signal (PES) representing a difference between a measured position of the head and a target position;
generating a repeatable disturbance for each of a plurality of tracks in each zone based on the PES; and
generating the metric for each zone as an average magnitude of the repeatable disturbance generated for the plurality of tracks.

5. The method as recited in claim 4, further comprising writing the feedback compensation values generated for each servo track to each servo track.

6. The method as recited in claim 4, further comprising:
averaging the metrics generated for the zones to generate an average metric; and
when the metric for the second zone does not exceed the first threshold and the average metric exceeds a second threshold, generating feedback compensation values for the second zone.

7. A disk drive comprising:
a disk comprising a plurality of servo tracks, wherein each servo track comprises a plurality of servo sectors;
a head actuated over the disk; and
control circuitry operable to:
  define a plurality of zones, wherein each zone comprises a plurality of the servo tracks;
  generate a metric for each zone;
  when the metric for a first zone exceeds a first threshold, generate feedback compensation values for at least two servo tracks, wherein the feedback compensation values compensate for a written-in error of the servo sectors of each servo track;
  when the metric for a second zone does not exceed the first threshold, skip generating feedback compensation values for the second zone;
  generate a position error signal (PES) representing a difference between a measured position of the head and a target position;
  generate a non-repeatable disturbance for each of a plurality of tracks in each zone based on the PES; and
  generate the metric for each zone as an average magnitude of the non-repeatable disturbance generated for the plurality of tracks.

8. A method of operating a disk drive comprising a head actuated over a disk comprising a plurality of servo tracks, wherein each servo track comprises a plurality of servo sectors, the method comprising:
defining a plurality of zones, wherein each zone comprises a plurality of the servo tracks;
generating a metric for each zone;
when the metric for a first zone exceeds a first threshold, generating feedback compensation values for at least two servo tracks, wherein the feedback compensation values compensate for a written-in error of the servo sectors of each servo track;
when the metric for a second zone does not exceed the first threshold, skipping generating feedback compensation values for the second zone;
generating a position error signal (PES) representing a difference between a measured position of the head and a target position;
generating a non-repeatable disturbance for each of a plurality of tracks in each zone based on the PES; and
generating the metric for each zone as an average magnitude of the non-repeatable disturbance generated for the plurality of tracks.

9. A disk drive comprising:
a disk comprising a plurality of servo tracks, wherein each servo track comprises a plurality of servo sectors;
a head actuated over the disk; and
control circuitry operable to:
  define a plurality of zones, wherein each zone comprises a plurality of the servo tracks;
  generate a metric for each zone;
  when the metric for a first zone exceeds a first threshold, generate feedback compensation values for at least two servo tracks, wherein the feedback compensation values compensate for a written-in error of the servo sectors of each servo track;
  when the metric for a second zone does not exceed the first threshold, skip generating feedback compensation values for the second zone;
  average the metrics generated for the zones to generate an average metric; and
  when the metric for the second zone does not exceed the first threshold and the average metric exceeds a second threshold, generate feedback compensation values for the second zone.

10. A method of operating a disk drive comprising a head actuated over a disk comprising a plurality of servo tracks, wherein each servo track comprises a plurality of servo sectors, the method comprising:
defining a plurality of zones, wherein each zone comprises a plurality of the servo tracks;
generating a metric for each zone;
when the metric for a first zone exceeds a first threshold, generating feedback compensation values for at least two servo tracks, wherein the feedback compensation values compensate for a written-in error of the servo sectors of each servo track;
when the metric for a second zone does not exceed the first threshold, skipping generating feedback compensation values for the second zone;
averaging the metrics generated for the zones to generate an average metric; and
when the metric for the second zone does not exceed the first threshold and the average metric exceeds a second threshold, generating feedback compensation values for the second zone.

\* \* \* \* \*